(12) United States Patent
Allan et al.

(10) Patent No.: US 9,748,011 B2
(45) Date of Patent: Aug. 29, 2017

(54) PACKAGING FOR TRANSPORTING AND/OR STORING RADIOACTIVE MATERIALS, INCLUDING IMPROVED MEANS FOR ATTACHING A SHOCK-ABSORBING COVER

(71) Applicant: TN International, Montigny le Bretonneux (FR)

(72) Inventors: Eric Allan, Louveciennes (FR); Nasser Zahri, Roubaix (FR); Cédric Mauvais, Versailles (FR)

(73) Assignee: TN INTERNATIONAL, Montigny le Bretonneux (FR)

(*) Notice: Subject to any disclaimer, the term of this patent is extended or adjusted under 35 U.S.C. 154(b) by 40 days.

(21) Appl. No.: 14/426,477

(22) PCT Filed: Sep. 30, 2013

(86) PCT No.: PCT/EP2013/070323
§ 371 (c)(1),
(2) Date: Mar. 6, 2015

(87) PCT Pub. No.: WO2014/053433
PCT Pub. Date: Apr. 10, 2014

(65) Prior Publication Data
US 2015/0213910 A1    Jul. 30, 2015

(30) Foreign Application Priority Data

Oct. 2, 2012   (FR) .................................... 12 59336

(51) Int. Cl.
*G21F 5/08* (2006.01)
*G21F 5/12* (2006.01)
(Continued)

(52) U.S. Cl.
CPC ............. *G21F 5/08* (2013.01); *B65D 77/067* (2013.01); *G21F 5/12* (2013.01); *F16B 43/00* (2013.01); *Y10T 403/645* (2015.01)

(58) Field of Classification Search
CPC  G21F 5/08; G21F 5/12; B65D 77/067; B65D 85/307; F16B 31/028; F16B 43/00;
(Continued)

(56) References Cited

U.S. PATENT DOCUMENTS 4,116,337 A * 9/1978 Backus ..................... G21F 5/08
                                                    376/272
4,410,120 A   10/1983 Henk
(Continued)

FOREIGN PATENT DOCUMENTS

DE   1 955 113     5/1971
EP   0 054 944 A1  6/1982
(Continued)

OTHER PUBLICATIONS

Search Report issued in French Patent Application No. FR 12 59336 dated Feb. 7, 2013.
(Continued)

*Primary Examiner* — Jack W Keith
*Assistant Examiner* — Daniel Wasil
(74) *Attorney, Agent, or Firm* — Pearne & Gordon, LLP

(57) ABSTRACT

The invention relates to a packaging for transporting and/or storing radioactive materials, comprising a packaging body extending along a longitudinal direction, and further including at least one shock-absorbing cover mounted on one of both longitudinally opposite ends of the packaging body, the absorbing cover comprising attaching portions (44) on said packaging body, each attaching portion defining a clearing hole (58) through which an element (24) screwed in the packaging body passes. According to the invention, the
(Continued)

attaching portion (44) has a deformable area (54) which, in the case of an outer bias on the absorbing cover leading to a contact strain between the screwed element (24) and the clearing hole (58), is designed to plastically deform.

11 Claims, 11 Drawing Sheets

(51) Int. Cl.
  *B65D 77/06* (2006.01)
  *F16B 43/00* (2006.01)
(58) Field of Classification Search
  CPC ... Y10T 403/64; Y10T 403/642; Y10T 403/645
  USPC .............................. 376/272; 411/9, 10, 531
  See application file for complete search history.

(56) References Cited

U.S. PATENT DOCUMENTS

| | | | |
|---|---|---|---|
| 4,488,048 A | 12/1984 | Bienek | |
| 5,161,655 A * | 11/1992 | Shimoda | E04B 1/98 188/268 |
| 5,303,836 A * | 4/1994 | Childress | G21F 5/008 376/272 |
| 6,280,127 B1 * | 8/2001 | Spilker | G21F 5/08 410/120 |
| 9,022,189 B2 * | 5/2015 | Saito | G21F 5/08 376/272 |
| 2007/0108086 A1 * | 5/2007 | Tamaki | G21F 5/08 206/521 |
| 2009/0169324 A1 * | 7/2009 | Fritsch | F16B 43/00 411/4 |

FOREIGN PATENT DOCUMENTS

| | | |
|---|---|---|
| EP | 1 571 677 A1 | 9/2005 |
| FR | 2 846 779 A1 | 5/2004 |
| GB | 1324015 * | 7/1973 |
| WO | WO 2012/002353 * | 1/2012 |

OTHER PUBLICATIONS

International Preliminary Report on Patentability issued in Application No. PCT/EP2013/070323 dated Oct. 10, 2014.
International Search Report issued in Application No. PCT/EP2013/070323 dated Oct. 28, 2013.
Written Opinion issued in Application No. PCT/EP2013/070323 dated Oct. 28, 2013.

* cited by examiner

PACKAGING FOR TRANSPORTING AND/OR STORING RADIOACTIVE MATERIALS, INCLUDING IMPROVED MEANS FOR ATTACHING A SHOCK-ABSORBING COVER

TECHNICAL FIELD

The present invention relates to the field of packagings for transporting and/or storing radioactive materials, preferably for irradiated fuels such as irradiated assemblies of nuclear fuel, or even for vitrified wastes.

STATE OF PRIOR ART

Conventionally, in order to transport and/or store radioactive materials, storage devices, also called storage "baskets" or "racks" are used. These storage devices, usually having a cylindrical shape and a substantially circular or polygonal cross-section, are able to receive radioactive materials. The storage device is intended to be accommodated in the cavity of a packaging in order to form together with the latter a container for transporting and/or storing radioactive materials, in which they are perfectly confined.

The abovementioned cavity is generally defined by a packaging body including a side body extending along a longitudinal axis of the packaging, as well as a packaging bottom and lid arranged at the opposite ends of the body, along the direction of the longitudinal axis. The side body comprises one or more concentric metal ferrules fitted with heat conduction means and radiation protection means. The latter are provided to form a barrier against the neutrons emitted by the radioactive material accommodated in the cavity, whereas the heat conduction means enable the heat released by the radioactive materials to be conducted towards the outside of the container, in order to avoid any heating risk likely to cause a degradation of these materials, an alteration of the mechanical properties of constituent materials of the structural elements of the packaging or their bonding (weld, screw), or even an abnormal pressure raise in the cavity.

The packaging also includes, attached to the opposite ends of the packaging body, shock-absorbing covers the function of which is especially to protect the lid and the bottom of the packaging, so as to keep the confinement of the radioactive material in the cavity, even in case of a fall.

In order to mount the absorbing covers on the packaging body, screwed elements are generally provided, such as attaching screws each passing through the clearing hole of an attaching portion integrated in the cover and in direct contact with the packaging body, each screw being screwed in a hole corresponding to the packaging body, by being arranged parallel to the longitudinal direction of the latter.

During a free fall test representing accident conditions of transport, the absorbing covers of the packaging can deform and/or shift in the transverse plane. Although the screws are usually protected from the shocks, there is however a shear failure risk of one or more attaching screws, with the possible consequence of the shock-absorbing cover being ejected. This risk is highly problematic because in case of the cover being ejected, the packaging can have great difficulties in satisfying other regulatory requirements, such as the drop on a punch bar which could lead to a seal loss of the lid, or even the fire resistance test which, in order to be satisfied, normally requires the presence of absorbing covers fitted with fire-proof means.

In order to solve this problem, increasing the clearance between each attaching screw and its clearing hole has been considered, so that the deformation of the cover in case of a fall fills this clearance, without shearing the screw.

However, this solution has several drawbacks. The first drawback lies in the complex deformation/shift of the cover, and hence in the difficulty in modelling it. Consequently, it is difficult to size the clearance so as to ensure that the attaching screw is not sheared in case of a fall of the packaging on the cover.

Moreover, the thus sized clearance is often very high, resulting in the screw head having a diameter smaller than the one of the clearing hole. It is then necessary to use a thrust washer which is highly exposed to a bending stress, in an assembly which no longer respects the conventional standards of screw tightening.

Solutions aiming at increasing the diameter of the screw heads, or even at multiplying the number of screws in order to restrict the cover ejection risks can be considered, but they directly impact the global weight of the packaging and can furthermore give raise to problems of dimensions.

DISCLOSURE OF THE INVENTION

Therefore, the purpose of the invention is to at least partially overcome the abovementioned drawbacks, related to the prior art achievements.

To do so, the object of the invention is a packaging for transporting and/or storing radioactive materials, comprising a packaging body extending along a longitudinal direction, and including at least one shock-absorbing cover respectively mounted on one of both longitudinally opposite ends of the packaging body, said absorbing cover comprising attaching portions on said packaging body, each attaching portion defining a clearing hole through which an element screwed in said packaging body passes.

According to the invention, at least one of said attaching portions has a deformable area which, in the case of an outer bias on the absorbing cover leading to a contact strain between said screwed element and the clearing hole, is designed to plastically deform.

By providing such an area the plastic deformation of which is a priority with respect to the screw shear, the invention is remarkable in that it contributes to a solution considerably restricting the risks of absorbing covers being ejected in case of a fall of the packaging, without necessarily requiring to oversize the diameter of the clearing holes. Assemblies in accordance with the conventional tightening standards can therefore be made.

The invention also provides an original and satisfying answer to the problem of the risk of absorbing covers being ejected, in case of a fall of the packaging causing an outer bias on one of the absorbing covers, at least one component of which is located in a transverse plane of this packaging. Indeed, if this transverse component creates a deformation and/or a shift of the cover which leads to a bearing of the inner surface of the clearing hole on the screwed element, then the deformable area is provided to plastically deform following this bearing, the screwed element in turn withstanding a shear failure during this plastic deformation, at least on a certain intensity range of contact strain.

Preferably, the screw withstands the shear failure at least up to an intensity value of contact strain corresponding to the maximum one experienced during the regulatory fall tests, in particular the nine meter free fall. In this respect, it is noted that it is essentially the deformable area which is designed to create, during its plastic deformation, an acceptable intensity of contact strain in order to avoid the shear of the screw.

Preferably, each of the attaching portions is fitted with the solution specific to the invention. This enables to benefit from the abovementioned advantages, whatever the impact area of the absorbing cover. Moreover, given that the deformation of the cover can spread well beyond the impact area, the screwed elements located away from this area are also protected from a possible shear failure. This case is especially experienced when the attaching portions are arranged on a ring, which, in case of shock, is likely to deform in an oval manner, and thus to bias the screwed elements located away from the shock, up to those arranged diametrically opposite the impact area.

By way of indication, the component in the transverse plane leading to the bearing of the clearing hole on the screwed element, after deformation/shift of the cover, can be radial, in particular when the cover has an outer surface of revolution centred on the longitudinal axis of the packaging. By "radial", it is here meant the direction in the transverse plane defined between the longitudinal axis of the packaging and the axis of the screwed element, longitudinally oriented. Of course, as a function of the shape of the cover and the nature of the impact, the component of said outer bias in the transverse plane can assume any other direction.

Preferably, said deformable area extends on an angular sector around the screwed element, at least part of this angular sector being oriented towards the outside of the cover. By orienting the deformable area in this way, the latter is able to best answer in case of outer biases applied to the cover. In this respect, the angular sector is preferably centred on the radial direction passing through the longitudinal axis and the axis of the screwed element. Moreover, the sector can extend on any angle deemed suitable, up to 360°. Finally, it is noted that the deformable area has not necessarily a circular shape, a straight slit beneath a ligament of material can for example be chosen, both ends of the slit defining in this case the extent of the angular sector.

Preferably, said deformable area has several elements angularly spaced from each other on said angular sector. Also, the gaps between the spaced elements form empty spaces in which the deformable areas can plastically deform.

According to a preferred embodiment of the invention, said deformable area extends, along the direction of the screwed element, on a thickness smaller than the height of said clearing hole.

Said deformable area then assumes the shape of a ligament of material located flush with a slit, or a groove when the ligament extends on 360°.

In this case, said slit or groove opens onto a same surface as the one onto which said clearing hole opens. Here also, the slit/groove forms an empty space into which the deformable area can plastically deform.

Said ligament of material is preferably annular and internally carries a jacket defining said clearing hole, the connection between the ligament and the jacket can be made at one of both opposite ends of the jacket, or between both these ends.

According to another preferred embodiment, said deformable area is a radially inwardly protruding part in the direction of the screwed element, said protruding part partially defining said clearing hole. Here, the clearing hole is preferably defined by at least two parts separated by a shoulder along the longitudinal direction, among which said protruding part.

According to yet another preferred embodiment, said attaching portion comprises a slit or groove opening onto one of both opposite surfaces of the attaching portion, as well as a recess opening into the other one of both surfaces, the slit/groove and the recess defining between them a ligament of material connecting a radially inwardly protruding part in the direction of the screwed element and partially defining said clearing hole, to an outer part of the attaching portion, said deformation area being formed by said ligament of material. Here, the slit/groove and the recess form empty spaces in which the ligament can plastically deform.

Whatever the considered embodiment, the screwed element preferably has a bearing head having a diameter larger than the one of the clearing hole. This enables an assembly in accordance with the conventional tightening standards to be carried out. For the same raisons, the deformable area is preferably designed so as not to plastically deform upon tightening the screwed element.

Said attaching portion is preferably integral with a bottom of the absorbing cover. It can be made in one piece or not with a bottom plate of this cover. Possibly, all the attaching portions are arranged on a same ring centred on the longitudinal axis of the packaging. The attaching portions can then be integral with the ring, by being obtained by machining this ring. Alternatively, the attaching portions can be independent elements attached to the ring, for example through screwing or welding. In the latter case, the attaching portions can be made of a material different from the material of the ring, for example of aluminium or one of its alloys.

Alternatively, the attaching portion is located on a side flange of the absorbing cover, the flange protruding radially inward or outward.

Finally, it is noted that said packaging body includes a lid, a bottom remote from the lid along said longitudinal direction, as well as a side packaging body connecting the bottom and the lid, where the screwed elements can be assembled on any of these three elements of the packaging body.

Other advantages and characteristics of the invention will appear upon reading the non-limiting detailed description hereinafter.

BRIEF DESCRIPTION OF THE DRAWINGS

This description is made by reference to the accompanied drawings among which.

DETAILED DESCRIPTION OF THE PREFERRED EMBODIMENTS

Figure 1:
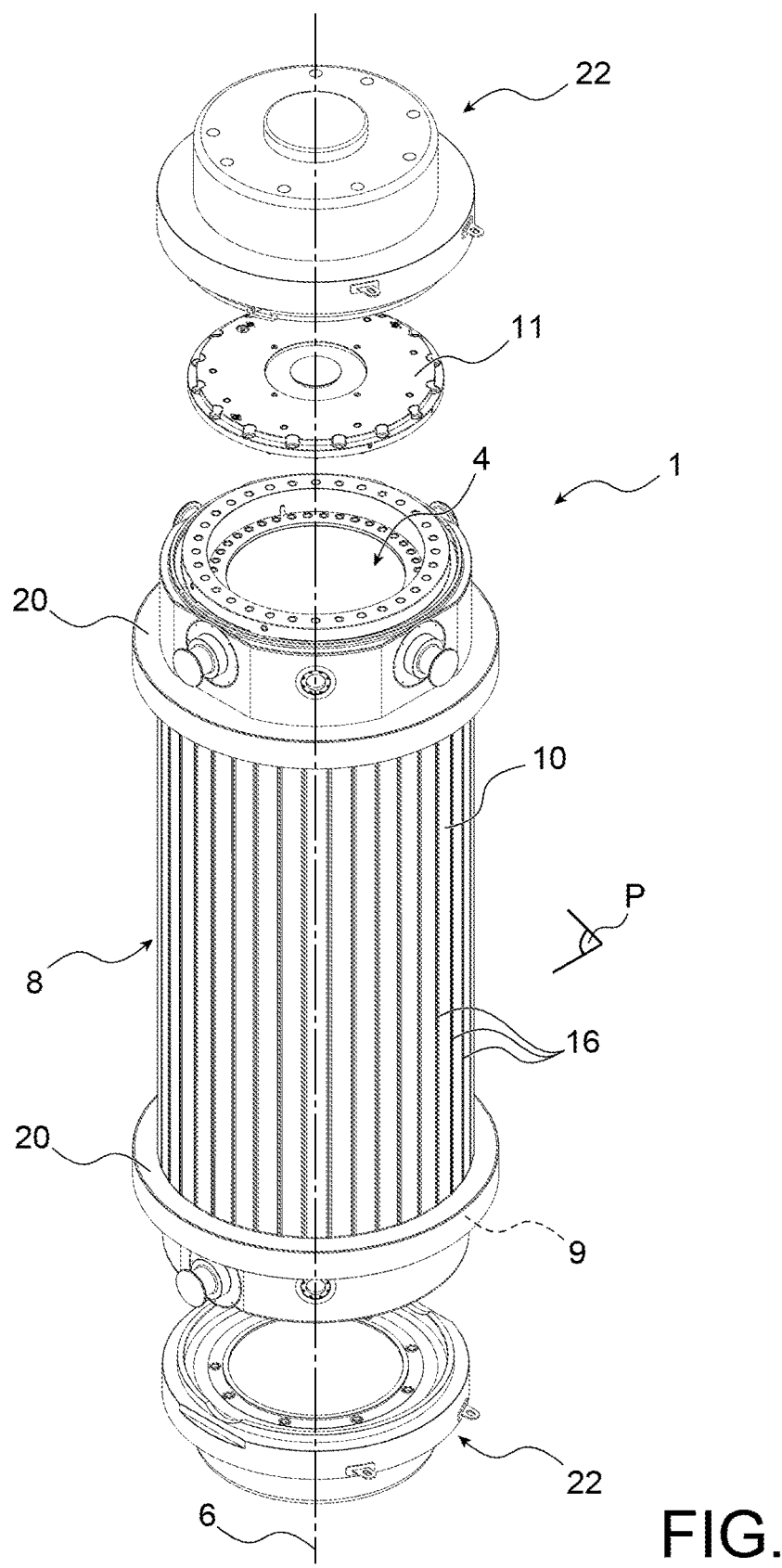
FIG. 1 shows a perspective view of a packaging for transporting and/or storing irradiated assemblies of nuclear fuel, according to a preferred embodiment of the invention.
Figure 2:
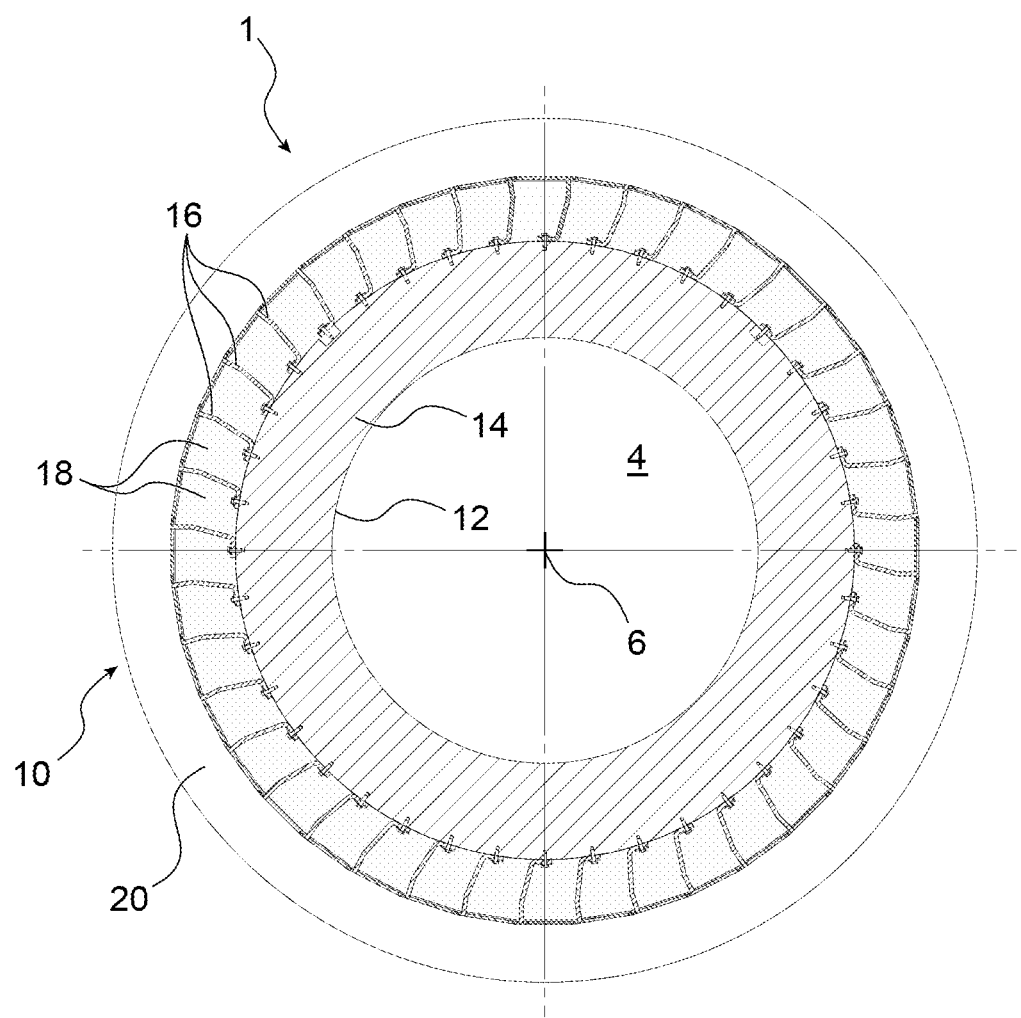
FIG. 2 shows a transverse cross-section view taken along the plane P of FIG. 1.

First, with reference to FIGS. 1 and 2, a packaging for transporting and/or storing irradiated assemblies of nuclear fuel is shown.

The packaging 2 object of the present invention defines an accommodating cavity 4 inside which lies a storage device (not shown) also called a storage basket, intended to receive the fuel assemblies. The set forms a container for transporting and/or storing irradiated assemblies of nuclear fuel.

The packaging 1 has a longitudinal axis 6. Throughout the description, the term "longitudinal" must be understood as parallel to the longitudinal axis 6 and to the longitudinal direction of the packaging. Also, the term "transverse" must be understood as orthogonal to the axis 6.

The packaging 2 has a packaging body 8 defining the cavity 4, and provided with a bottom 9 on which the storage device is intended to rest in a vertical position, with a lid 11 arranged at the opposite longitudinal end of the packaging, and with a side body 10 extending around and along the longitudinal axis 6, that is along the longitudinal direction of the packaging. The bottom and the lid are thus arranged at the longitudinal ends of the side body 10.

The bottom 9 can be made in one piece with a part of the side body 10, whereas the lid 11 is by nature removable, so as to be able to release/seal an opening of the side body 10 through which the basket is intended to be introduced/extracted.

The side body 10 is thus the one which defines the accommodating cavity 4, thanks to a side inner surface 12 having a substantially cylindrical shape and a circular cross-section, and an axis merged with the axis 6.

In this preferred embodiment, the side body 10 first has a metal wall/ferrule 14 centred on the longitudinal axis 6. Externally, the ferrule 14 carries fin-shaped heat conduction means 16, as well as neutron protection means 18 designed to form a barrier against the neutrons emitted by the fuel assemblies accommodated in the storage device.

Close to the longitudinal ends of the packaging body, the latter is fitted with shock protection rings 20, centred on the axis 6.

Figure 3:
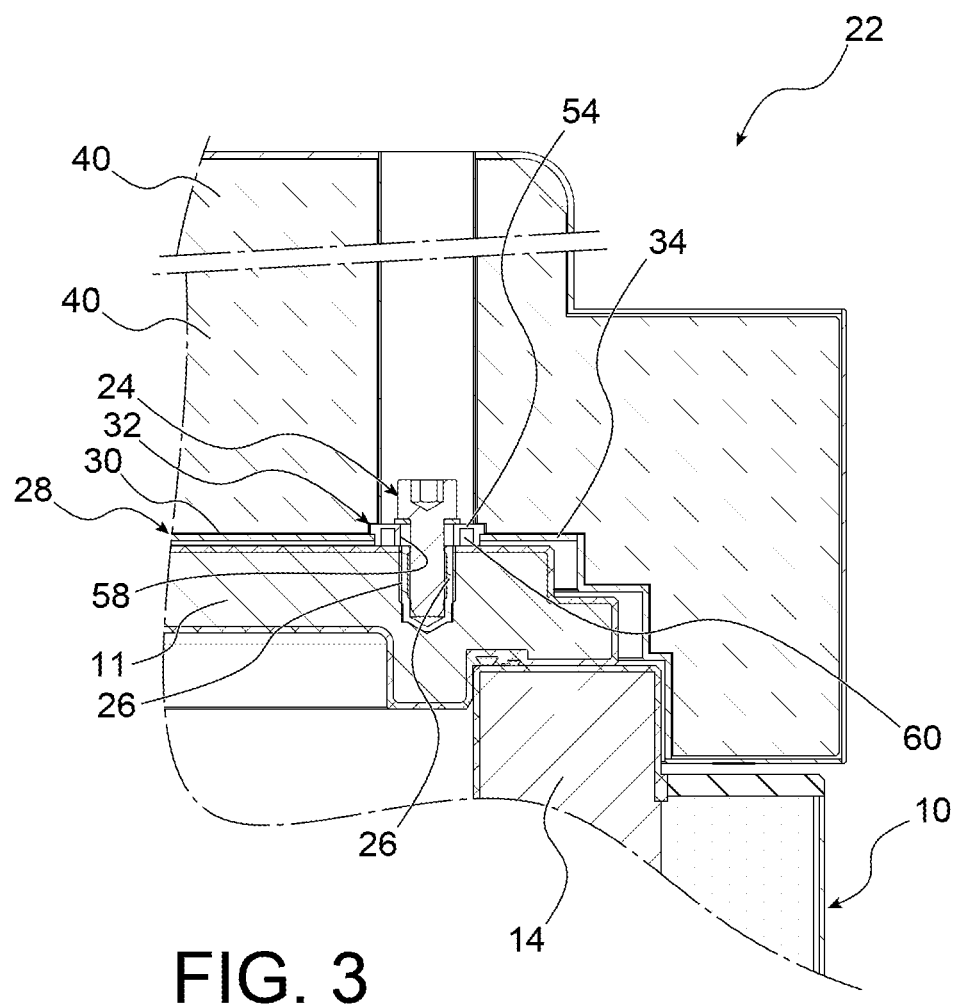
FIG. 3 shows an enlarged longitudinal cross-section view of a part of the shock-absorbing cover fitting the packaging shown in FIG. 1.

Furthermore, the packaging 1 includes, respectively mounted on both its opposite longitudinal ends, two shock-absorbing covers 22, attached to the packaging body 8 using longitudinally oriented attaching screws 24, arranged close to the periphery of each cover. FIG. 3 shows a part of the upper cover 22 covering the lid. Here, the screws 24, being for example between 4 and 12 in number and circumferentially distributed, are directly screwed in the threaded ports 26 of the lid 11. Alternatively, these screws could be attached on the ferrule 14 of the side body 10, without departing from the scope of the invention.

With reference now to FIGS. 3 to 6, the means implemented to attach the cover 22 on the lid 11 will now be more precisely described. In this respect, it is noted that the following description relates to the attachment of the upper cover on the lid, but that the same principle can be applied to attach the lower cover on the bottom or the side body.

In the preferred embodiment shown in FIGS. 3 to 6, attaching the cover 22 is carried out through its bottom 28, located facing the upper surface of the lid. The bottom can be made in one piece, or obtained thanks to several elements assembled to each other. The latter case has been shown in the figures, with the bottom 28 having a disk-shaped central plate 30 centred on the axis 6, an attaching ring 32 arranged around the disk, as well as another peripheral ring 34 arranged around the attaching ring 32. These elements 30, 32, 34 are preferably welded to each other in order to form the bottom facing the upper surface of the lid 11.

As can be seen in FIG. 3, the bottom 28 supports a shock-absorbing layer 40, for example made of wood.

Figure 4:
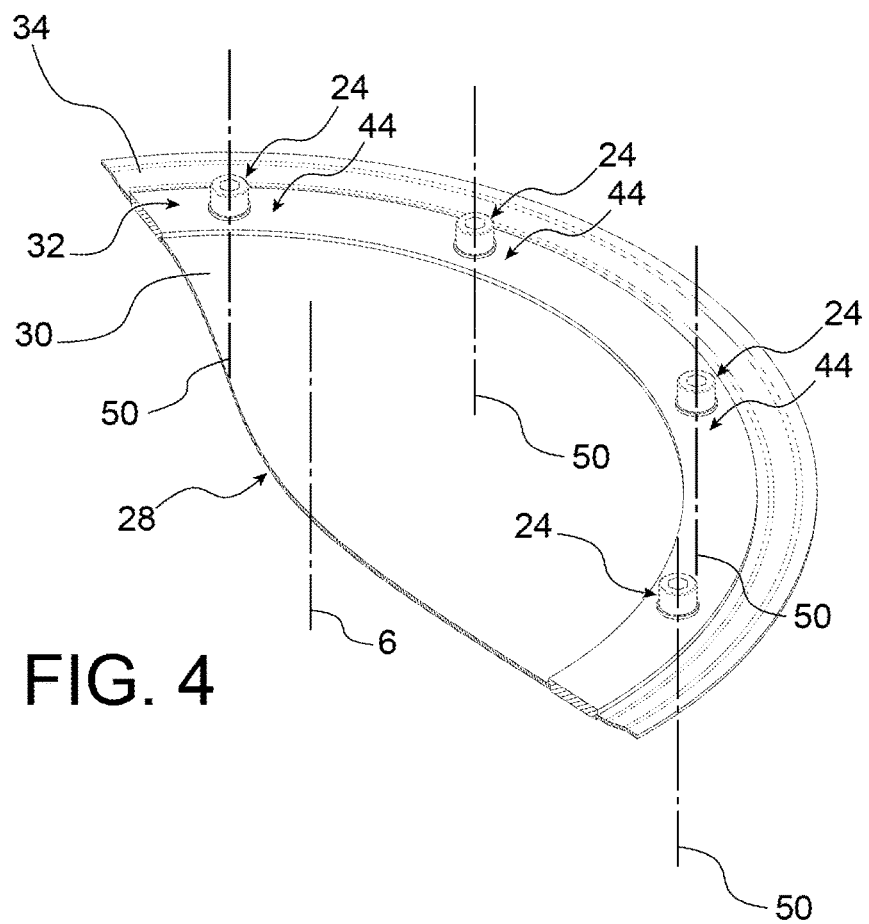
FIG. 4 shows a perspective view of a part of the bottom of the absorbing cover shown in FIG. 3.
Figure 5:
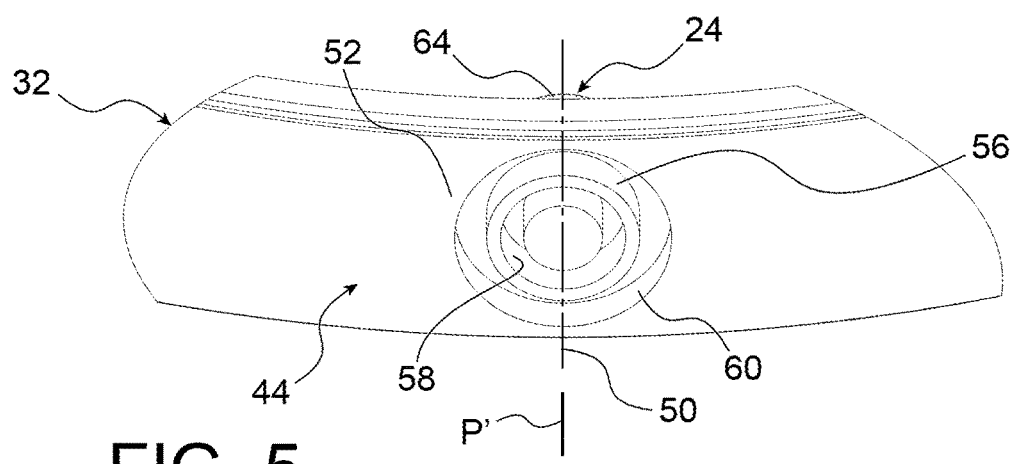
FIG. 5 shows an enlarged perspective view of the bottom shown in the preceding figure, integrating an attaching portion cooperating with an attaching screw.
Figure 6:
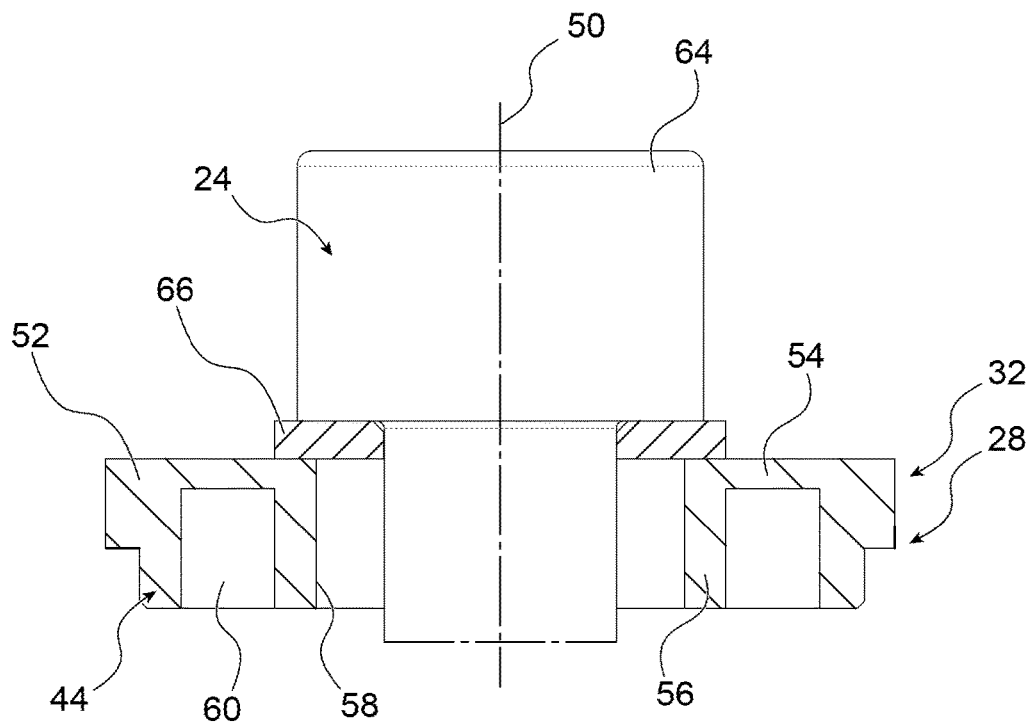
FIG. 6 shows a cross-section view taken along the plane P' of FIG. 5.

The ring 32, preferably made of steel, is fitted with a plurality of attaching portions 44 succeeding along the circumferential direction. These portions 44, shown in FIGS. 4 to 6, are thus each made of an angular sector of the ring 32, centred on the axis 50 of the screw 24 associated with each attaching portion 44.

Each portion 44 comprises an outer part 52 extending around the axis 50 throughout the thickness of the ring 32, and defining at its centre a bore carrying an annular ligament of material 54, centred on the axis 50. Here, the ligament 54 is located at the top end of the bore, its upper surface being arranged in the continuation of the upper surface of the ring 32. The ligament 54, protruding radially inward from the bore, only extends on part of the thickness of the ring, the thickness ratio being preferably between 5 and 35.

The ligament 54 internally carries a jacket 56 centred on the axis 50 and internally defining the clearing hole 58 of the screw 24. The ligament 54 is also located at the top end of the jacket, its upper surface being thus arranged in the continuation of the upper surface of this jacket 56, which extends on a thickness identical to the one of the ring 32.

Thus, the ligament 54 is arranged flush with a groove 60, formed under the ligament between said bore and the outer surface of the jacket 56. The groove 60 centred on the axis 50 opens towards the lower part on the same surface as the one into which the clearing hole 58 opens, where this groove can be obtained through a simple annular machining on the lower surface of the ring 32. Alternatively, in FIG. 6a, another configuration is shown in which the ligament 54 is arranged centred in the bore along the direction of thickness of the ring 32, the ligament thus carrying the jacket 56 in the middle. In this case, lower 60 and upper 60' grooves lie on either side of this ligament 54.

Back to the embodiment of FIG. 6, the screw 24 the bearing head 64 of which has a diameter larger than the one of this clearing hole 58, passes through the same hole 58, where a washer 66 can be interposed between both elements. Also, the screw 24 tightening can be carried out in accordance with standard practice, without too much exposing the washer to a bending stress.

One of the characteristics of the present invention lies in the fact that the ligament of material 54 forms a deformable area of the portion 44. This area 54 is designed so that in the case of an outer bias occurring on the absorbing cover 22, for example in the case of the regulatory free fall test leading to a contact strain between the screw 24 and the inner surface of the clearing hole 58, this area 54 plastically deforms while the screw 24 withstands the shear failure.

Figure 7:
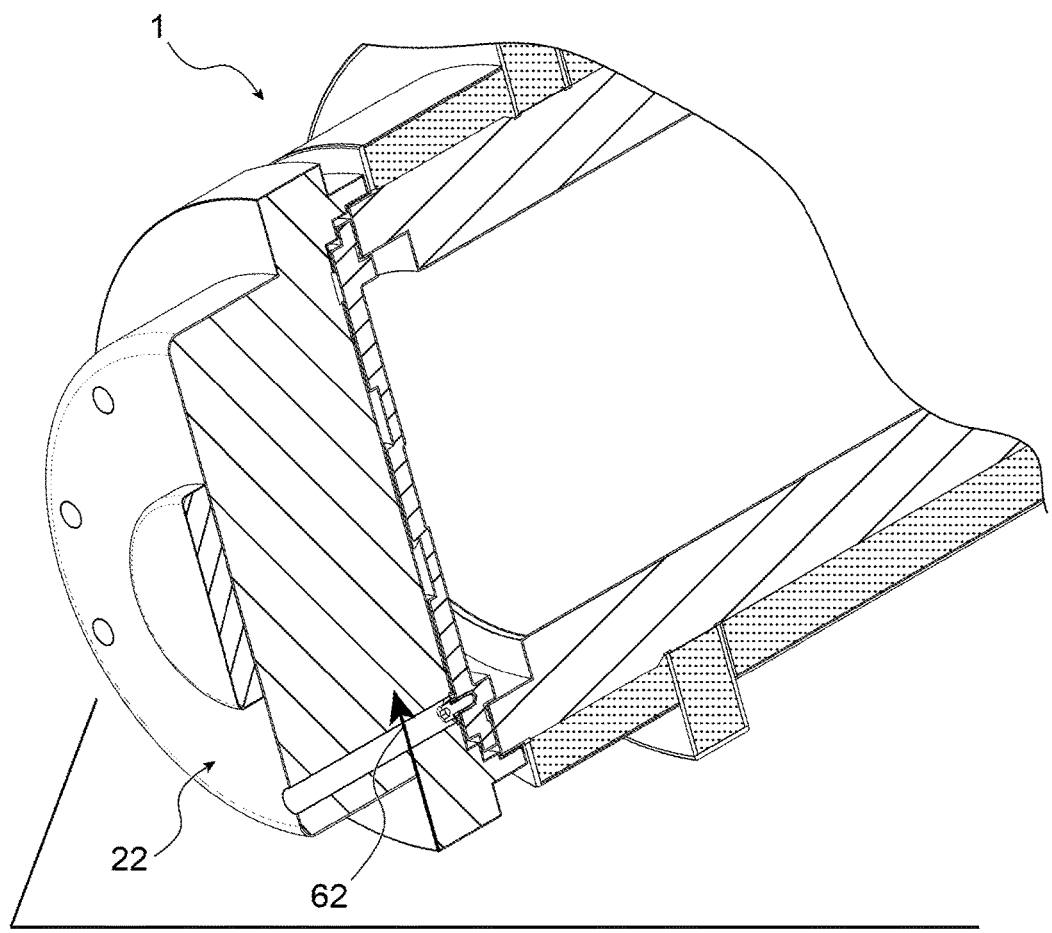
FIG. 7 shows a partial perspective view of the packaging falling on its upper absorbing cover.

Consequently, in case of the fall of the packaging on the cover 22 as schematized in FIG. 7, causing an outer bias on the cover with at least one transverse component represented by the arrow 62, the cover 22 tends to transversally deform and/or shift, with as a possible consequence if the bias is sufficiently high, a contacting and then a contact strain between the inner surface of the clearing hole 58 and the screw 24 shaft.

The design is provided such that in such conditions, the plastic deformation of the deformable area formed by the ligament 54 has priority over the shear of the screw 24. Consequently, during the shock, the ligament 54 is crushed by plastically deforming under the effect of the contact strain applied by the screw 24 and passing through the jacket 56. Preferably, thanks to the plastic deformation of the area 54, the screw 24 can withstand the shear failure at least up to an intensity value of the contact strain corresponding to the maximum value experienced during the regulatory fall tests, in particular the nine meter free fall.

Figure 6A:
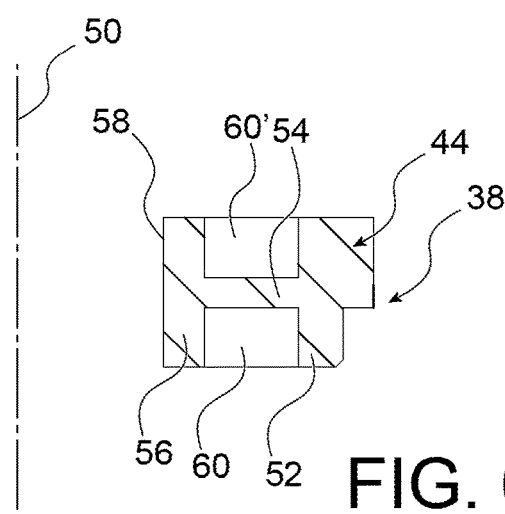
FIG. 6a shows a view analogous to the one of FIG. 6, according to an alternative embodiment.
Figure 8:
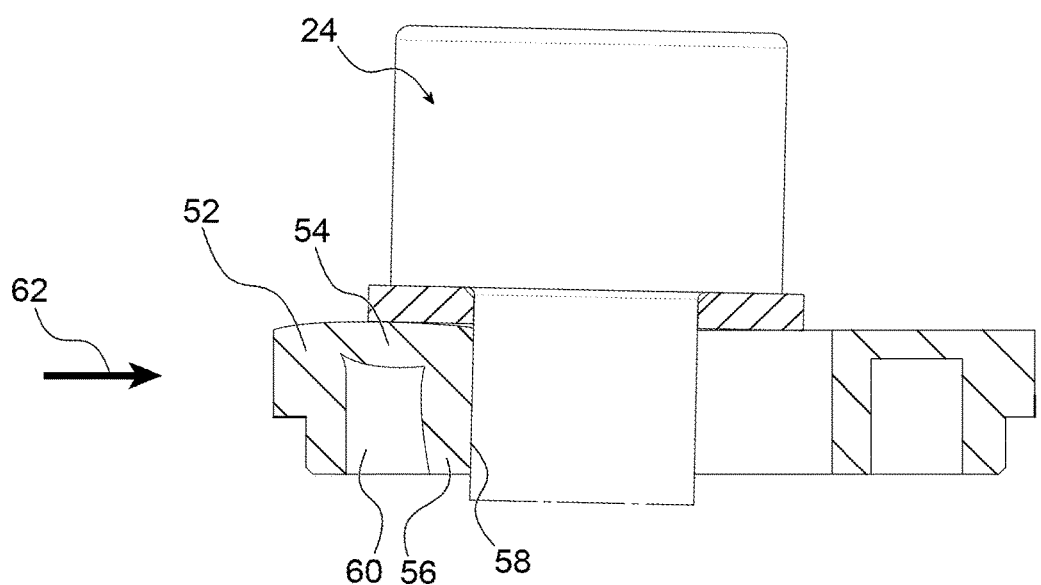
FIG. 8 is a view similar to the one of FIG. 6, the assembly being in a deformed configuration obtained following the fall schematized in FIG. 7.

The crush deformation of the ligament 54 is here allowed by the upward longitudinal expansion of this ligament, but mainly by its downward expansion, into the groove 60 as schematized in FIG. 8. In the case of FIG. 6a, this longitudinal expansion is carried out upward and downward into both grooves 60, 60'.

It is specified that the deformable area is however sufficiently rigid not to deform in the normal operating conditions of the container, especially during transport or handling operations.

Figure 9:
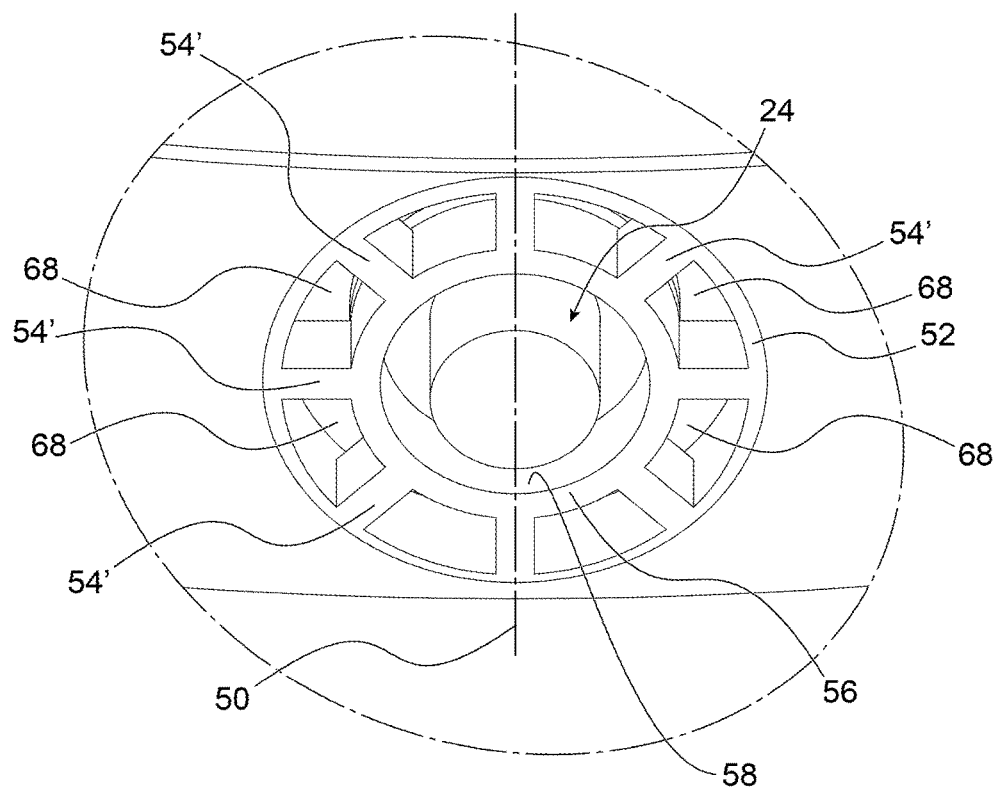
FIG. 9 shows a view similar to FIG. 5, according to another alternative embodiment.
Figure 9A:
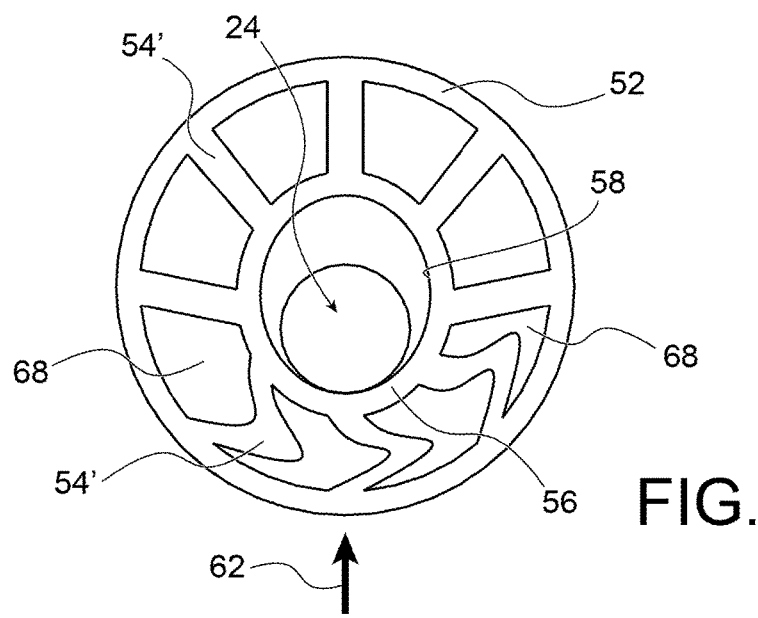
FIG. 9a is a top view of the attaching portion shown in FIG. 9, the assembly being in a deformed configuration obtained following the fall schematized in FIG. 7.

In the alternative embodiment shown in FIG. 9, the junction between the outer portion 52 and the jacket 56 comprises gaps with angularly distributed regular spaces, revealing a plurality of branch shaped elements 54' connecting the outer part 52 to the jacket 56, these branches preferentially extending throughout the height of the jacket 56. These branches 54' are thus angularly spaced from each other by empty spaces 68, which transversally extend and in which the branches 54' plastically deform in case of a fall, as can be seen in FIG. 9a.

Figure 10:
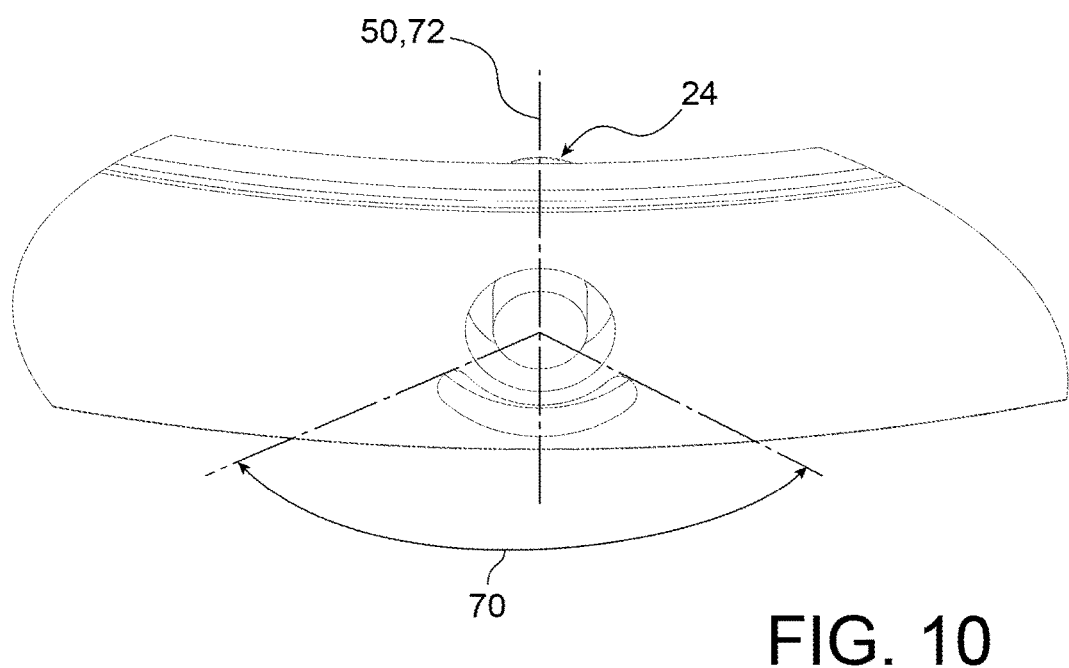
FIG. 10 shows a view similar to the one of the FIG. 5, according to yet another alternative embodiment.

FIG. 10 shows an alternative embodiment in which the deformable area does not extend on a 360° angular sector, but on a smaller value. Here, the restricted angular sector 70, for example between 90 and 180°, is oriented towards the outside of the packaging by being preferably centred on the radial direction 72 passing through the longitudinal axis of the packaging and the axis 50 of the screw 24. This positioning enables a better answer of the deformable area in case of an outer bias having its transverse component oriented along said radial direction 72.

It is indicated that on this restricted angular sector, the deformable area can be continuous such as in FIG. 6, or have gaps such as in FIG. 9.

Figure 11:
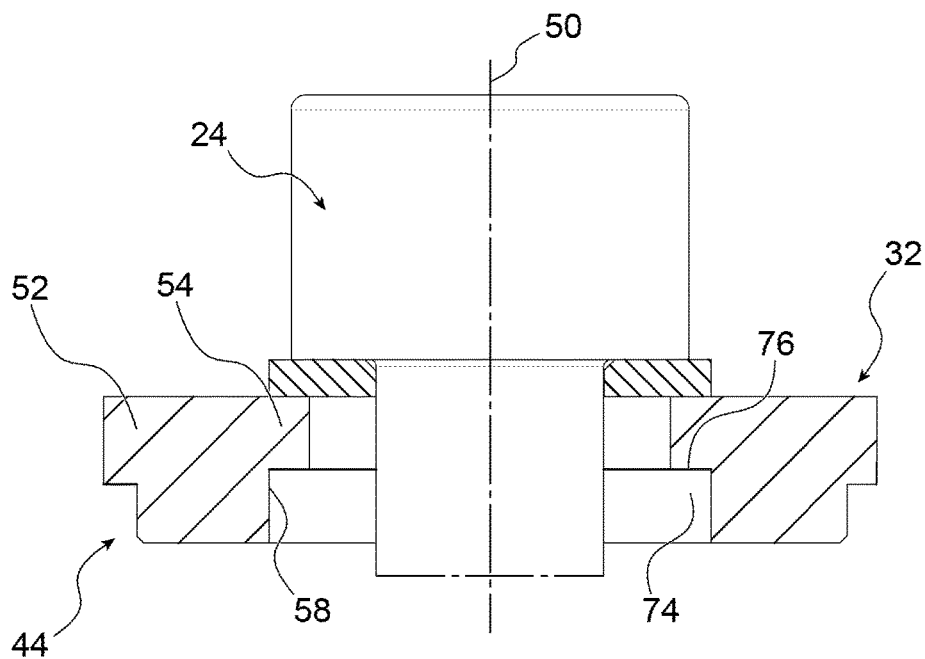
FIGS. 11 and 12 show respectively views similar to those of FIGS. 6 and 8, the attaching portions being according to another preferred embodiment of the invention.
Figure 12:
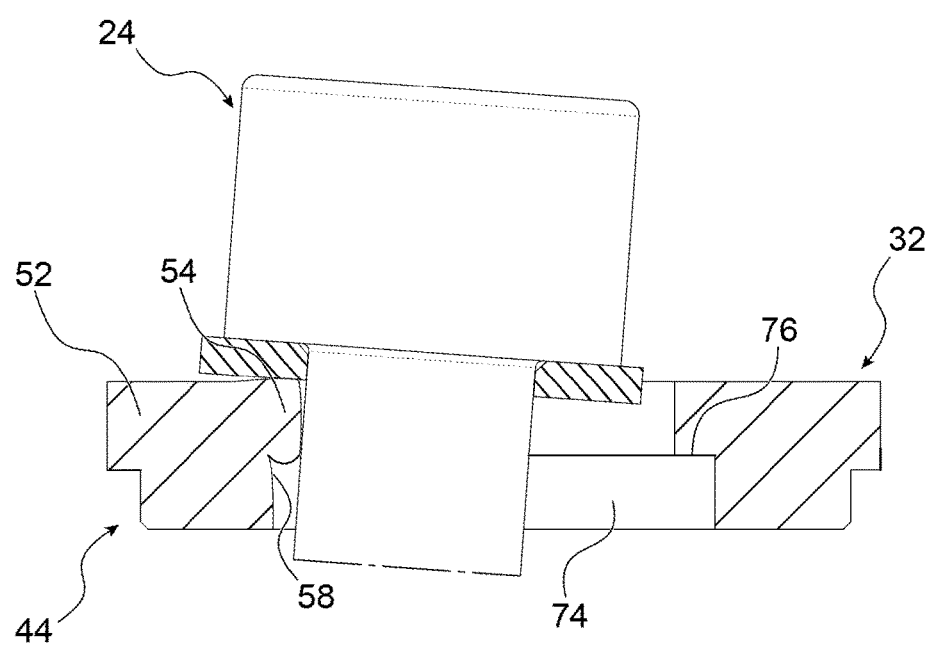

With reference now to FIGS. 11 and 12, another preferred embodiment is shown in which the deformable area 54 always assumes the shape of an annular part radially inward protruding in the direction of the screw 24 from the bore, but which has an inner surface partially defining the clearing hole 58. A material recess 74 centred on the axis 50 opens onto the lower surface of the ring 32, and has a diameter larger than the one of the inner surface of the deformable part 54. Consequently, the clearing hole 58 is here formed by two parts separated along the longitudinal direction by a shoulder 76. Said two parts are the protruding part 54 and the part resulting from the recess 74, in which the part 54 can plastically deform by longitudinally expanding in case of a fall, as schematized in FIG. 12.

Figure 13:
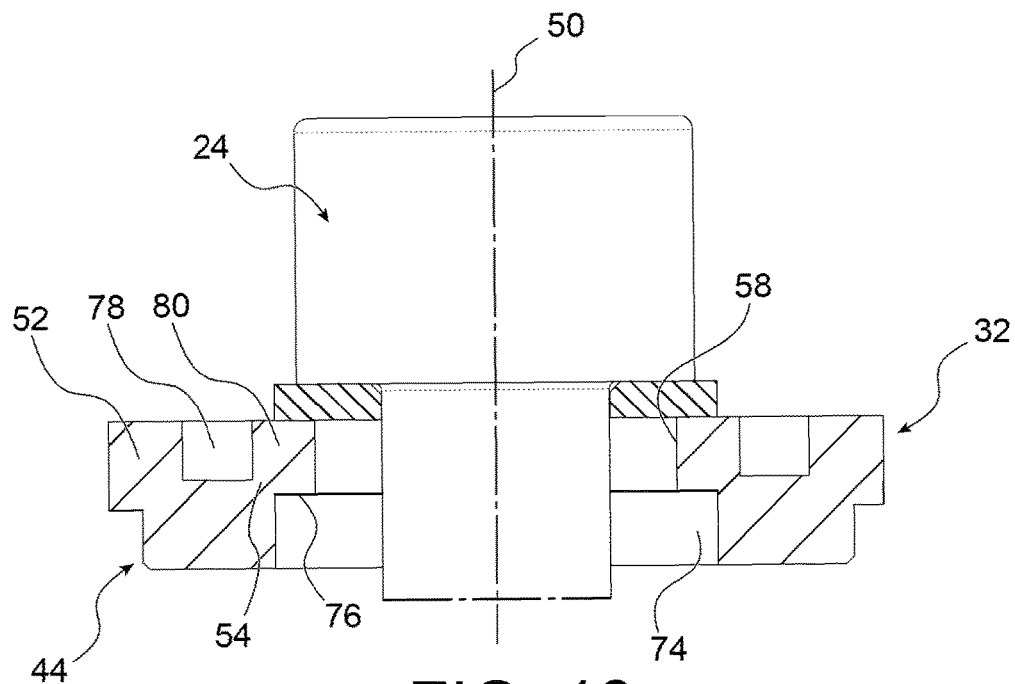
FIGS. 13 and 14 show views respectively similar to those of FIGS. 6 and 8, the attaching portions being according to yet another preferred embodiment of the invention.
Figure 14:
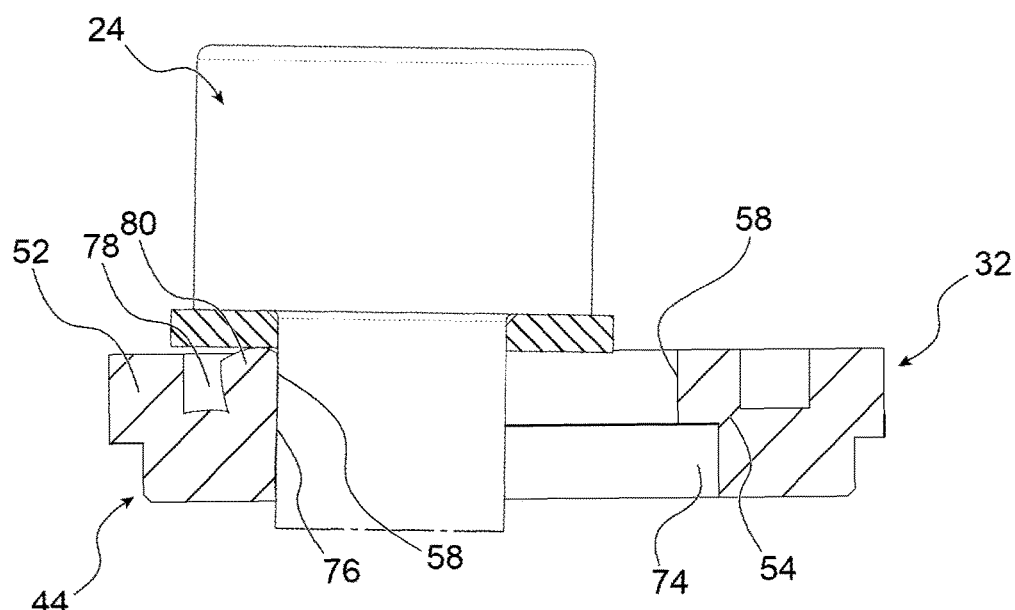

With reference now to FIGS. 13 and 14, another preferred embodiment is shown in which, from the preceding embodiment, a groove 78 is further made opening onto the upper surface of the ring 32 and centred on the axis 50, this groove 78 extending radially outward with respect to the recess 74.

The groove 78 and the recess 74 define between them the ligament of plastically deformable material 54, connecting a part 80 protruding radially inward partially defining the clearing hole 58, to the outer part 52 of the portion 44.

Expansion of the ligament 54 in case of a fall is here carried out in the groove 78 and/or the recess 74.

Of course, the embodiments shown in FIGS. 11 to 14 can also have a deformable ligament on a restricted angular sector, as depicted in FIG. 10.

Of course, those of ordinary skill can bring about various modifications to the invention which has just being described, only by way of non-limiting examples.

What is claimed is:

1. Packaging (1) adapted to contain radioactive materials, comprising a packaging body (8) extending along a longitudinal direction and further comprising two longitudinally opposite ends of the packaging body, said packaging further including at least one shock-absorbing cover (22) mounted on one of the longitudinally opposite ends of the packaging body, said absorbing cover comprising attaching portions (44) in contact with said packaging body, each attaching portion defining a clearing hole (58), said packaging further including at least one screwed element (24) having a bearing head with a diameter larger than a diameter of the clearing hole and a shaft which passes through said clearing hole and is screwed into said packaging body, wherein at least one of said attaching portions (44) has a deformable area (54) adjacent to an empty area that is provided along the shaft of the at least one screwed element, wherein in case of an outer bias on the absorbing cover (22) leading to a contact strain between said screwed element (24) and the clearing hole (58), the deformable area is adapted to plastically deform and expand at least partially into the empty area.

2. The packaging according to claim 1, wherein said deformable area (54) extends on an angular sector (70) around the screwed element (24), at least part of this angular sector being oriented towards the outside of the cover.

3. The packaging according to claim 2, wherein said deformable area (54) has several elements (54') angularly spaced from each other on said angular sector (70).

4. The packaging according to claim 1, wherein a thickness of said deformable area (54) along the direction of the screwed element (24) extends over less than than the height of said clearing hole (58).

5. The packaging according to claim 4, wherein said deformable area assumes the shape of a ligament of material (54) located flush with a slit or a groove (60).

6. The packaging according to claim 5, wherein said slit or groove (60) opens onto a same surface as the one onto which said clearing hole (58) opens.

7. The packaging according to claim 6, wherein said ligament of material (54) is annular and internally carries a jacket (56) defining said clearing hole (58).

8. The packaging according to claim 4, wherein said deformable area is a part (54) protruding radially inward in the direction of the screwed element (24), said protruding part (54) partially defining said clearing hole (58).

9. The packaging according to claim 1, wherein said attaching portion (44) is formed integrally with a bottom (28) of the absorbing cover (22).

10. The packaging according to claim 1, wherein said packaging body (8) includes a lid (11), a bottom (9) remote from the lid along said longitudinal direction, as well as a packaging side body (10) connecting the bottom and the lid.

11. The packaging according to claim 1, wherein each attaching portion (44) comprises at least one part in contact with the shaft.

\* \* \* \* \*